(12) United States Patent
Doire et al.

(10) Patent No.: US 7,856,389 B2
(45) Date of Patent: Dec. 21, 2010

(54) DYNAMIC BOOK YIELD ANALYSIS

(75) Inventors: Steven Charles Doire, Mansfield, MA (US); Robert Ray Salzman, Mount Prospect, IL (US)

(73) Assignee: Deutsche Bank AG, New York, NY (US)

( * ) Notice: Subject to any disclaimer, the term of this patent is extended or adjusted under 35 U.S.C. 154(b) by 1253 days.

(21) Appl. No.: 11/250,857

(22) Filed: Oct. 13, 2005

(65) Prior Publication Data

US 2006/0085316 A1 Apr. 20, 2006

Related U.S. Application Data

(60) Provisional application No. 60/618,824, filed on Oct. 14, 2004.

(51) Int. Cl.
*G06Q 40/00* (2006.01)
(52) U.S. Cl. ............................ 705/36 R; 705/35; 705/37
(58) Field of Classification Search ................... 705/37, 705/35
See application file for complete search history.

(56) References Cited

U.S. PATENT DOCUMENTS

| | | | |
|---|---|---|---|
| 7,058,583 B2 * | 6/2006 | Long et al. ..................... | 705/35 |
| 7,120,598 B2 * | 10/2006 | Ocampo ....................... | 705/35 |
| 2005/0187851 A1 * | 8/2005 | Sant ............................. | 705/36 |
| 2007/0192228 A1 * | 8/2007 | Phelps et al. .............. | 705/36 R |

* cited by examiner

*Primary Examiner*—James A Kramer
*Assistant Examiner*—James A Vezeris
(74) *Attorney, Agent, or Firm*—White & Case LLP

(57) ABSTRACT

The present invention relates to systems, methods, data structures and user interfaces for generating and presenting information as to how and why the book yield of an investment portfolio changed over a time interval. Dynamic book yield analysis is particularly useful for bond portfolio analysis and management. Transactions and events that occur in a financial market during a pre-specified time period and relating to a portfolio of assets are identified by a computer server. Specifically, the book yields and book values for these transactions and events are accessed from the portfolio accounting system and the data for each transaction/event are categorized according to transaction/event type (though net cash equivalents are first separated out into their own category). The categorized information is then stored in a data structure residing on the system. Book yields and book values are identified for the portfolio of assets at the beginning and end of the pre-specified time period and book yields and book values are calculated for each category of transactions/events previously identified. The effect of each category of transactions/events on the book yield of the portfolio of assets is then quantified. The results of the analysis can then be displayed to investors and portfolio managers in dynamic book yield attribution reports generated by a reporting system. The reports can be used by these investors and portfolio managers to make and execute additional investment decisions based, at least in part, on the quantified impacts of each category of transactions/events on the portfolio book yield.

15 Claims, 10 Drawing Sheets

Portfolio Book Yield Attribution Summary

*Between* Time 0 *and* Time 1
*All data is on a settlement date basis*
200

| | 201 Portfolio Book Value | 202 Category Book Yield | 203 Portfolio Basis Point Impact | Credit Quality | Effective Duration | Effective Convexity | 204 Realized Gain/Loss | Category Benchmark YTW |
|---|---|---|---|---|---|---|---|---|
| Beginning Portfolio 210 | 332,820,883.60 | 4.68 | 0.0 | Aa1 | 3.44 | (0.34) | | |
| Buys 215 | 27,027,929.07 | 4.25 | (2.9) | Aa1 | 3.98 | (0.35) | | |
| Sells 220 | (2,394,427.14) | 4.82 | (0.1) | Baa1 | 2.88 | 0.12 | 123,725.98 | 1.65 |
| Paydowns 225 | (26,462,203.49) | 5.17 | (3.2) | Aaa | 1.50 | (1.01) | 0.11 | 0.58 |
| Transfer 230 | 1,000,000.00 | 4.38 | (0.1) | Baa3 | 3.94 | (0.22) | | |
| Transfer Out 235 | (998,618.51) | 4.39 | 0.1 | Baa3 | 4.01 | 0.18 | 23,391.49 | |
| Calls 240 | (3,687,390.00) | 5.72 | (1.0) | A3 | 1.06 | 0.02 | | |
| Net Cash Equivalents 245 | 101,295,027.13 | 0.97 | (93.3) | Cash | 0.01 | 0.00 | | 2.33 |
| Cash Change 250 | (25,065,207.37) | 0.00 | 29.1 | | | | | |
| Amortization 255 | (994,147.22) | 3.50 | 0.3 | | | | | |
| Other 260 | 0.00 | 0.00 | 0.0 | | | | | |
| Book Yield Drift 265 | | | 14.1 | | | | | |
| Ending Portfolio 270 | 402,541,846.07 | 4.11 | (56.9) | Aa1 | 2.82 | (0.20) | | |

*Benchmark: YTW U.S. Aggregate*

FIG. 2

Portfolio Book Yield Attribution Detail
Between Time 0 and Time 1

| 301 Security Name/ Cusip | Tmcode | Inst Type/ Eff Date | 302 303 Trade Date/ Settle Date | LotId | 304 305 Units/ Price | 306 Book Value/ YTW Bench | 307 Book Yield | 308 Basis Point Impact | Credit Quality | Eff Dur. | Eff Conv. | 309 Market Value | Gain/Loss |
|---|---|---|---|---|---|---|---|---|---|---|---|---|
| 300 Buys | | | | | | | | | | | | |
| US Agency Passthru | | | | | | | | | | | | |
| 320 FHLMC P/T Pool #A14172 31229GNT56 | B | USP/T 02/09/04 | 01/27/04 02/12/04 | 2199 | 7,463,403.02 103.797 | 7,743,428.35 | 4.40 | (0.534) | Agcy | 2.99 | (0.81) | 7,746,779.10 | 0.00 |
| 320 FHLMC Gold P/T Pool #A15319 31296P4C3 | B | USP/T 02/10/04 | 02/10/04 02/12/04 | 2200 | 2,986,780.44 104.188 | 3,110,284.65 | 4.29 | (0.305) | Agcy | 2.22 | (2.18) | 3,111,851.87 | 0.00 |
| US Agency Passthru Total | | | | | | 10,853,713.00 0.00 | 4.37 | (0.839) | | 2.77 | (1.20) | 10,858,630.97 | 0.00 |
| Mortgage-Related | | | | | | | | | | | | |
| 320 RAMP 2004-RZ1 AI3 76098ST50 | B | ABS/CMO 03/25/04 | 03/08/04 03/30/04 | 2209 | 1,020,000.00 99.985 | 1,019,867.90 | 2.87 | (0.458) | Aaa | 2.76 | 0.09 | 1,019,849.04 | 0.00 |
| 320 RFMS2 2004-HI1 A3 76110VPP7 | B | ABS/CMO 03/08/04 | 03/08/04 03/29/04 | 2203 | 2,960,000.00 100.594 | 2,977,575.00 | 2.93 | (1.293) | Aaa | 2.79 | 0.10 | 2,977,575.00 | 0.00 |
| Mortgage-Related Total | | | | | | 3,997,442.90 0.00 | 2.92 | (1.752) | | 2.78 | 0.09 | 3,997,424.04 | 0.00 |
| Consumer | | | | | | | | | | | | |
| 320 COMET 2003-C4 C4 14041NAZ4 | B | ABS/CMO 05/06/04 | 05/06/04 05/11/04 | 2214 | 1,000,000.00 102.855 | 1,028,239.81 | 5.30 | 0.159 | Baa2 | 5.17 | 0.33 | 1,028,554.69 | 0.00 |
| Consumer Total | | | | | | 1,028,239.81 0.00 | 5.30 | 0.159 | | 5.17 | 0.33 | 1,028,554.69 | 0.00 |
| Non Agency Commercial Mortgage Backed | | | | | | | | | | | | |
| 320 CSFB 2004-C1 A3 22541SAC2 | B | ABS/CMO 02/26/04 | 02/26/04 03/15/04 | 2201 | 3,350,000.00 100.500 | 3,366,750.00 | 4.31 | (0.313) | Aaa | 5.95 | | 3,366,750.00 | 0.00 |
| 320 DMARC 1998-C1 A2 251562AC8 | B | ABS/CMO 04/19/04 | 04/19/04 04/22/04 | 2212 | 1,370,000.00 109.047 | 1,493,942.19 | 5.74 | 0.392 | Aaa | 3.00 | 0.11 | 1,493,942.19 | 0.00 |
| 320 DMARC 1998-C1 A2 251562AC8 | B | ABS/CMO 04/20/04 | 04/20/04 04/23/04 | 2213 | 520,000.00 108.984 | 566,718.75 | 5.74 | 0.150 | Aaa | 3.00 | 0.11 | 566,718.75 | 0.00 |
| Non Agency Commercial Mortgage Backed Total | | | | | | 5,427,410.94 0.00 | 4.85 | 0.229 | | 4.83 | 0.04 | 5,427,410.94 | 0.00 |
| Finance | | | | | | | | | | | | |

FIG. 3

|  | Results | | | Calculations | | | | |
| --- | --- | --- | --- | --- | --- | --- | --- | --- |
|  | A | B |  | C | D | E | F | G |
|  | Known | G for trans |  | Known | Beg B | C−D | A / Ending A | E*F |
|  | Book Value | Portfolio Book Yield |  | Transaction Category Book Yield | Book Yield if Transacted at Beginning Portfolio Yield | Transaction Category Gross Advantage / (Disadvantage) | Weighting (Contribution to Portfolio's Ending Book Yield) | Transaction Category Portfolio Impact Advantage / (Disadvantage) |
| Beginning Portfolio | 100.00 | 9.00% |  | 9.00% | 9.00% |  |  |  |
| Buys | 28.00 | (0.46%) |  | 7.00% | 9.00% | (2.00%) | 28.00/123.00 | (46) bps |
| Sells | (5.00) | 0.20% |  | 4.00% | 9.00% | (5.00%) | (5.00)/123.00 | 20 bps |
| Transfers In | 10.00 | 0.16% |  | 11.00% | 9.00% | 2.00% | 10.00/123.00 | 16 bps |
| Transfers Out | (10.00) | (0.08%) |  | 10.00% | 9.00% | 1.00% | (10.00)/123.00 | (8) bps |
| Ending Portfolio | 123.00 | 8.83% |  | 8.83% |  |  |  | (17) bps |

| Portfolio ID | System Security ID | Primary Security ID | Security Short Name | Instrument Type | Begin Shares | Begin Book Value | Begin Amort | Begin Book Yield | Acquisition Shares | Acquisition Book Value | Acquisition Book Yield |
|---|---|---|---|---|---|---|---|---|---|---|---|
| 53652 | 101457 | 00209AAE6 | AT&T Wireless Svcs Inc Sr Nt | CFI | 50,000.00 | 56,982.56 | (1,518.94) | 5.20 | 0.00 | 0.00 | 0.00 |
| 53652 | 92266 | 013104AJ3 | Albertsons Inc Sr Nt | CFI | 100,000.00 | 104,420.95 | (1,784.05) | 6.61 | 0.00 | 0.00 | 0.00 |
| 53652 | 103191 | 013817AF8 | Alcoa Inc Nt | CFI | 20,000.00 | 20,765.52 | (200.88) | 5.34 | 0.00 | 0.00 | 0.00 |
| 53652 | 117767 | 013817AH4 | Alcoa Inc Bd | CFI | 20,000.00 | 20,013.61 | (4.59) | 5.36 | 0.00 | 0.00 | 0.00 |
| 53652 | 117767 | 013817AH4 | Alcoa Inc Bd | CFI | 10,000.00 | 10,028.89 | (7.21) | 5.33 | 0.00 | 0.00 | 0.00 |
| 53652 | 117767 | 013817AH4 | Alcoa Inc Bd | CFI | 10,000.00 | 10,078.94 | (18.46) | 5.25 | 0.00 | 0.00 | 0.00 |
| 53652 | 117767 | 013817AH4 | Alcoa Inc Bd | CFI | 20,000.00 | 20,131.77 | (31.03) | 5.27 | 0.00 | 0.00 | 0.00 |
| 53652 | 153971 | 026609AM9 | American Home Product Wyeth Nt | CFI | 75,000.00 | 84,398.17 | (1,125.08) | 4.60 | 0.00 | 0.00 | 0.00 |
| 53652 | 153569 | 073383FP93 | BSCMS 2004-PWR5 A1 | ABS/CMO | 195,771.08 | 196,254.46 | (2.13) | 3.74 | 0.00 | 0.00 | 0.00 |
| 53652 | 95666 | 097014AE4 | Boeing Cap Corp Nt | CFI | 50,000.00 | 50,602.54 | (944.96) | 4.73 | 0.00 | 0.00 | 0.00 |

FIG. 6B

| STIF Acquisition Shares | STIF Acquisition Book Value | STIF Acquisition Book Yield | TransIn Shares | TransIn Book Value | TransIn Book Yield | Exchanges In Shares | Exchanges In Book Value | Exchanges In Book Yield | Disposition Shares | Disposition Book Value | Disposition Book Yield | STIF Disposition Shares | STIF Disposition Book Value |
|---|---|---|---|---|---|---|---|---|---|---|---|---|---|
| 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |

FIG. 6C

| Payup Shares | Payup Book Value | Payup Book Yield | End Shares | End Book Value | End Amort | End Book Yield | Amort Book Value | Amort Book Yield | Impairments Book Value | Impairments Book Yield | STIF Disposition Book Yield | TransferOut Shares | TransferOut Book Value | TransferOut Book Yield | Exchanges Out Shares | Exchanges Out Book Value | Exchanges Out Book Yield | Maturity Shares | Maturity Book Value | Maturity Book Yield | Call Shares | Call Book Value | Call Book Yield | Paydown Shares | Paydown Book Value | Paydown Book Yield |
|---|---|---|---|---|---|---|---|---|---|---|---|---|---|---|---|---|---|---|---|---|---|---|---|---|---|---|
| | | | | | | | | | | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| | | | | | | | | | | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| | | | | | | | | | | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| | | | | | | | | | | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| | | | | | | | | | | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| | | | | | | | | | | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| | | | | | | | | | | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| | | | | | | | | | | | 0.00 | 0.00 | 0.00 | 0.00 | 0.00 | 0.00 | 0.00 | 0.00 | 0.00 | 0.00 | 0.00 | 0.00 | 0.00 | (2,012.66) | (2,012.66) | 3.74 |
| | | | | | | | | | | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

FIG. 6D

| Payup Shares | Payup Book Value | Payup Book Yield | End Shares | End Book Value | End Amort | End Book Yield | Amort Book Value | Amort Book Yield | Impairments Book Value | Impairments Book Yield | Positives Book Value | Positives Book Yield | Negatives Book Value | Negatives Book Yield | Cash Change |
|---|---|---|---|---|---|---|---|---|---|---|---|---|---|---|---|
| 0.00 | 0.00 | 0.00 | 50,000.00 | 56,904.21 | (1,597.29) | 5.20 | (78.35) | 5.20 | 0.00 | 0.00 | 56,982.56 | 5.20 | (56,982.56) | 5.20 | 0.00 |
| 0.00 | 0.00 | 0.00 | 100,000.00 | 104,378.60 | (1,826.40) | 6.61 | (42.36) | 6.61 | 0.00 | 0.00 | 104,420.95 | 6.61 | (104,420.95) | 6.61 | 0.00 |
| 0.00 | 0.00 | 0.00 | 20,000.00 | 20,757.95 | (208.45) | 5.34 | (7.58) | 5.34 | 0.00 | 0.00 | 20,765.52 | 5.34 | (20,765.52) | 5.34 | 0.00 |
| 0.00 | 0.00 | 0.00 | 20,000.00 | 20,013.44 | (4.76) | 5.36 | (0.18) | 5.36 | 0.00 | 0.00 | 20,013.61 | 5.36 | (20,013.61) | 5.36 | 0.00 |
| 0.00 | 0.00 | 0.00 | 10,000.00 | 10,028.62 | (7.48) | 5.33 | (0.27) | 5.33 | 0.00 | 0.00 | 10,028.89 | 5.33 | (10,028.89) | 5.33 | 0.00 |
| 0.00 | 0.00 | 0.00 | 10,000.00 | 10,078.24 | (19.16) | 5.25 | (0.69) | 5.25 | 0.00 | 0.00 | 10,078.94 | 5.25 | (10,078.94) | 5.25 | 0.00 |
| 0.00 | 0.00 | 0.00 | 20,000.00 | 20,130.60 | (32.20) | 5.27 | (1.17) | 5.27 | 0.00 | 0.00 | 20,131.77 | 5.27 | (20,131.77) | 5.27 | 0.00 |
| 0.00 | 0.00 | 0.00 | 75,000.00 | 84,290.35 | (1,232.90) | 4.60 | (107.82) | 4.60 | 0.00 | 0.00 | 84,398.17 | 4.60 | (84,398.17) | 4.60 | 0.00 |
| 0.00 | 0.00 | 0.00 | 193,758.42 | 194,197.00 | (41.94) | 3.68 | (44.80) | 3.74 | 0.00 | 0.00 | 196,254.46 | 3.74 | (196,254.46) | 3.68 | 0.00 |
| 0.00 | 0.00 | 0.00 | 50,000.00 | 50,565.96 | (981.54) | 4.73 | (36.57) | 4.73 | 0.00 | 0.00 | 50,602.54 | 4.73 | (50,602.54) | 4.73 | 0.00 |

DYNAMIC BOOK YIELD ANALYSIS

CROSS-REFERENCE TO RELATED APPLICATION

This application claims priority benefit under 35 U.S.C. §119(e) of U.S. Provisional Patent Application No. 60/618,824, filed Oct. 14, 2004, the contents of which are incorporated by reference herein in their entirety.

FIELD OF THE INVENTION

The present invention pertains to the field of portfolio management.

BACKGROUND OF THE INVENTION

Investors have traditionally measured the performance of bond portfolios, as well as those who manage them, on the basis of the total return they generate over time, where the term "total" is used to refer to the overall return from an investment regardless of its source. For example, the annual total return on a bond may include both the coupons paid during the applicable year and the value change during the applicable year. In which case, as shown in Equation 1 below, the total return would equal the coupon return plus the value change divided by the bond's value at the beginning of the year.

$$\text{Total Return} = (\text{coupon return} + \text{value change})/\text{beginning value} \quad (1)$$

To further illustrate the concept of total return, an example total return calculation using Equation 1 is provided below. In the example, a $100 par bond with a 5% coupon that is to be paid annually at the end of the year has a market value equal to its face value of $100 at the beginning of the year. The market value of the bond increases to $102 by year's end and the 5% coupon is paid. Accordingly, the coupon return equals five dollars, the value change equals two dollars, and the total return equals seven percent.

$100 par bond, 5% coupon paid annually at year end
$100 invested at beginning of year
$100 bond market value at beginning of year
$102 bond market value at end of year Total Return=(($100*.05)+($102−$100))/$100=(5+2)/100=0.07=7.00%

In the foregoing example the total return is shown to have two components: a coupon return component and a price return component. Total return is of interest to investors as it represents the change in their overall economic position resulting from an investment. However, the individual components that comprise total return are also of interest to many investors. The coupon return equates to investor cash flow and is the main component of current accounting income. However, value change (price return) does not equate to cash flow and does not represent accounting income, since the price return is not realized unless the bond is sold.

Many bond investors, such as insurance companies, are yield-focused investors who want to maximize their ongoing investment income. Accordingly, they are primarily concerned with the coupon component of total return rather than the price return component. Additionally, stakeholders in the bond investor's company such as analysts and shareholders generally place greater value on investment income than on realized gains or losses, since the former represents recurring income, whereas the latter represents what is often considered a non-recurring item. Hence, information pertaining to the coupon component of return is of primary interest to many investors, since it is related to the recurring realized investment income associated with the bond portfolio.

However, the recurring realized investment income of a bond is not determined solely by the coupon component of return, but is also dependent upon the amortization, if any, associated with the bond. When a bond is purchased at other than its face (par) value, the beginning book value (generally, its purchase price) of a bond is systematically amortized towards its par value over the life of the bond so that on its maturity date the bond's book value is equal to par value. If the bond was purchased at a premium, the recurring realized investment income is reduced by the amount of the amortization and if the bond was purchased at a discount, the recurring realized investment income is increased by the amount of the amortization. (Amortization that increases the book value of an investment is often referred to as "accretion").

The "book yield" is a measure of a bond's recurring realized investment income that combines both the bond's coupon return plus its amortization. It is defined as the bond's Internal Rate of Return (IRR) of all its cash flows. The following example illustrates the concept of book yield. A $100 par bond having a 5% coupon to be paid annually at year end is purchased for a $95 purchase price at the beginning of the year. The bond is set to mature in three years. In this example, the book yield will be greater than the 5% coupon on the discount bond as the investor will receive both the 5% coupon and the difference between purchase price and maturity value (an additional $5). The book yield at purchase will be 6.90%, which is the internal rate of return or IRR of the cash flows. The $5 discount is amortized into income over the life of the bond and the book value of the bond is increased until it reaches its par value of $100 at maturity.

Accounting systems calculate a bond's book yield when a bond is first purchased. The calculated book yield for an individual investment is then multiplied by the book value of that investment to derive the accounting income to be recorded from that investment. This calculation is typically depicted in an amortization table showing the amount of income and changes to the book value over time for amortization. An amortization table for the above example is provided below in Table 1.

TABLE 1

Assumptions
5% annual coupon bond, $100 par value, maturity of 3 years, purchased for $95

| | Book Value | | | Income | | | | |
| --- | --- | --- | --- | --- | --- | --- | --- | --- |
| Period | Beg Book | Amort | End Book | Coupon | Amort | Income | Book Yield | Cash Flow |
| 0 | | | | | | | | (95.00) |
| 1 | 95.00 | 1.56 | 96.56 | 5.00 | 1.56 | 6.56 | 6.90% | 5.00 |

TABLE 1-continued

Assumptions
5% annual coupon bond, $100 par value, maturity of 3 years, purchased for $95

| | Book Value | | | Income | | | | |
|---|---|---|---|---|---|---|---|---|
| Period | Beg Book | Amort | End Book | Coupon | Amort | Income | Book Yield | Cash Flow |
| 2 | 96.56 | 1.66 | 98.22 | 5.00 | 1.66 | 6.66 | 6.90% | 5.00 |
| 3 | 98.22 | 1.78 | 100.00 | 5.00 | 1.78 | 6.78 | 6.90% | 105.00 |
| | | | | | | | 6.90% IRR | |

Even though a bond's book yield through maturity is calculated when the bond is first purchased, the book yield is not necessarily static and it may have to be recalculated. Indeed, for bonds that allow prepayment of principle, such as mortgage backed securities (MBS), the IRR and the book yield typically do vary over the life of the investment. A simple MBS, or pass-through MBS is a bond backed by a pool of residential mortgage loans. The underlying loans will have a stated or nominal maturity. For example, the nominal maturity is 30 years for a pool of 30 year mortgages. However, on average the pool will be paid down much sooner than 30 years as many mortgagors prepay their loans through refinancing, selling their house, and making extra principal payments. Estimating how quickly the pool will be paid down, or the pool's prepayment speed, is desirable when investing in these securities. For MBS bond investments at other than par (premium or discount), the book yield on these securities will change as prepayment speeds change. An illustrative example follows.

Assume that an MBS bond is purchased for $105 with a par of $100. At the time of purchase the average life of the underlying pool of mortgages is 10 years. The accounting that ensues at purchase date is to amortize the $5 premium over the 10 year average life of the investment utilizing the bond's IRR. Assume that that same MBS bond is held by the investor one year later and that prepayment speeds have increased (i.e. interest rates have fallen and many mortgagors are refinancing) such that the average life of the underlying pool of mortgages has dropped to five years from ten years. The accounting is now revised with the amortization of the premium now occurring over a period that is ½ what was originally anticipated. The revised faster amortization changes the book yield of the bond. The direction of book yield change is a function of whether the bond was purchased at a premium or discount and whether prepayment speeds increased or decreased as illustrated Table 2 below.

TABLE 2

| | Prepayment Speeds Increase | Prepayment Speeds Decrease |
|---|---|---|
| Purchased at Premium over par | Book Yield Decreases | Book Yield Increases |
| Purchased at Discount from par | Book Yield Increases | Book Yield Decreases |

Not only can the book yield for a bond portfolio change due to changes in the book yields of the individual bonds that comprise the portfolio, the book yield for a bond portfolio can change even if the book yields of the individual bonds that comprise the portfolio remain constant. This is true because the book yield of a portfolio is the weighted average of the book yields of the bonds that comprise the portfolio, where the weighting factor for an individual bond is the book value of the individual bond divided by the book value of the bond portfolio (the book value of the bond portfolio is equal to the sum of the book values of the individual bonds). Since the book value of a bond that was not purchased at face value varies over time based on its amortization, the weighting factor for that bond as well as the weighting values for all of the other bonds in the portfolio will change over time. Accordingly, the book yield for a portfolio that contains bonds not purchased at face value will change over time even if the book values of all the individual bonds do not change.

There is a long felt yet unmet need for systems and methods that provide information as to how book yield of a portfolio changes over time and why those changes occur.

SUMMARY OF THE INVENTION

The present invention is based in part on the recognition that information pertaining to how and why the book yield of a bond portfolio changed over a time interval can be useful for the purposes of both bond portfolio management and bond portfolio assessment. Additionally, the invention is in part based on a recognition that the utility of dynamic book yield analysis is not necessarily limited to bond portfolios and that such analyses may have utility for other types of investment portfolios. Accordingly, it is an object of the present invention to provide computer-implemented systems, methods, data structures and user interfaces (as used herein, the term "user interface" includes but is not limited to user-computer interfaces, but can include documents or other means of presenting information that is represented in any humanly-comprehensible form) for generating and presenting information as to how and why the book yield of an investment portfolio changed over a time interval.

Embodiments of the present invention may be used by investors, portfolio managers and/or any others interested in learning how specific transactions and the categories to which they belong affect an entire portfolio's book yield over a period of time. Embodiments may also be used to analyze the impact of events not ordinarily thought of as transactions, such as amortization and changes in the book yield of held bonds, on a portfolio's book yield. Dynamic book yield analysis is particularly useful for bond portfolio analysis and management. Portfolios that can be used in conjunction with the embodiments of this invention, however, are not limited to bond portfolios and may include any type of investment or mixed portfolio, provided that such investments have a book value and a book yield, or corollaries to book value and book yield. Some examples include dividend paying equity portfolios and real estate portfolios.

One aspect of the present invention is an embodiment of a method for analyzing how a portfolio's book yield changes over a period of time. Another aspect of the present invention is an embodiment of a system implementing a method for analyzing how a portfolio's book yield changes over a period of time. For example, a system server accesses a portfolio accounting system for data on transactions pertaining to a given portfolio that occurred during a pre-specified time period. This time period may be based on transaction date or it may be based on settlement date, a novel approach to this type of analysis. This data, including, without limitation, book yields and book values, is then stored in a data structure on a storage device where each transaction is sorted into separate categories based on transaction type. One embodiment of the present invention would involve the separation of all net cash equivalent transactions into their own distinct category. Any computer system having access to this data structure may then be used to identify the portfolio book value and portfolio book yield at the beginning and end of the time period, determine book values and book yields for entire categories of transactions, and, using the values just mentioned, calculate the impact of each transaction category on the overall portfolio book yield. Prior to these calculations, the relevant data values may be adjusted to account for tax. Another embodiment of the invention will also involve the calculation of portfolio book yield drift. If the absolute value of the calculated portfolio book yield drift is greater than a pre-selected threshold value, a computer system implementing an embodiment of the invention may generate an alert notifying an investor or manager of this fact.

Users of embodiments of the present invention will be able to view the portfolio data and the results of the dynamic book yield analysis in a number of ways including, without limitation, a user interface displayable on a computer screen, an electronic document deliverable via e-mail, or a printed hard copy report. These reports and interfaces may be generated by a reporting system and such generation may be triggered periodically, upon the existence of some condition detected by the system, or upon the request of one utilizing an embodiment of the present invention. Recipients of the reports may then rely on the results of the dynamic book yield analysis, at least in part, to make and execute future investment decisions.

In accordance with an aspect of the present invention, a computer user interface for use in analyzing a change in a portfolio's book yield from a first time to a second time is provided, comprising a plurality of transaction information fields displayed on the interface. Each transaction information field of the plurality of transaction information fields corresponds to a type of transaction occurring between the first time and the second time and comprises a plurality of values. The plurality of values includes a value that identifies the type of transaction that corresponds to the each information field. The plurality of values also includes a value that corresponds to an impact that the type of transaction had on the portfolio's book yield.

In accordance with another aspect of the present invention, a computer-implemented method of analyzing a change in a portfolio's book yield from a first time to a second time comprises the following steps. Using the computer, a plurality of types of transactions that occurred between the first time and the second time is identified. Again using the computer, the effect that each of the plurality of types of transactions had on the portfolio's book yield is quantified.

Yet another aspect of the present invention, involving a computer-implemented method of calculating a book yield drift occurring in a portfolio's book yield from a first time to a second time, comprises the following steps. A gross book yield drift associated with a specific investment is calculated. The gross book yield drift is then adjusted by a weighting factor to determine a net book yield drift for the specific investment.

In a further aspect of the present invention, a computer-implemented method for analyzing a change in book yield of a portfolio over time comprises the following steps. A first book yield for the portfolio as of a first point in time is calculated with the computer. A second book yield for the portfolio as of a second point in time is also calculated with the computer. A change in the book yield of the portfolio is then calculated with the computer, the calculation based on the first book yield and the second book yield.

According to still another aspect of the present invention, a computer-implemented method for computing a book yield attribution for a portfolio of assets is provided. The method comprises the step of calculating with the computer a quantitative effect of transactions, involving at least one of the assets and corresponding to a pre-selected category of transactions, on the book yield of a portfolio of assets during a pre-selected time period.

In accordance with yet another aspect of the present invention, a computer-implemented method for calculating an impact of transactions of a pre-selected category on book yield of a portfolio during a pre-selected time period is provided. The method comprises the following steps. A book yield for transactions of the pre-selected category is calculated with the computer. A portfolio book yield at the beginning of the pre-selected time period is identified. A difference between the book yield for transactions of the pre-selected category and the portfolio book yield at the beginning of the pre-selected time period is then calculated with the computer. A book value for the pre-selected category is calculated. A portfolio book value at the end of the pre-selected time period is identified. A quotient based on the category book value and the portfolio book value at the end of the pre-selected time period is then calculated with the computer. Then, the portfolio book yield impact of the pre-selected category is calculated with the computer as a product of the difference and the quotient.

In a further aspect of the present invention, a method of managing a database representing performance aspects of a portfolio is provided, comprising the following steps. A data structure is created in the database representing characteristics of the performance of the portfolio. A measure of change in book yield for the portfolio over a pre-selected time period is computed. The data structure is modified to reflect the computed book yield change measure.

According to still another aspect of the present invention, a computer system is provided for analyzing a change in book yield of a portfolio during a pre-selected time period. The computer system comprises a data structure for representing performance aspects of the portfolio, a computer server for identifying at least one first transaction occurring in the portfolio at a point in time during the pre-selected time period and storing information related to the at least one first transaction in the data structure, and a processing means for quantifying an effect of a pre-selected category of transactions on the book yield of the portfolio during the pre-selected time period based at least in part on information stored in the data structure. The pre-selected category of transactions in the processing means includes at least one transaction occurring in a financial market at a point in time during the pre-selected time period selected from the group consisting of the at least one first transaction and at least one second transaction.

BRIEF DESCRIPTION OF THE DRAWINGS

FIG. 2 shows a summary user interface, displayable on a computer screen, embodying an aspect of the present invention.

FIG. 3 shows a transactional detail user interface, displayable on a computer screen, embodying an aspect of the present invention.

FIGS. 4A-4C show graphical and tabular representations of an embodiment of a dynamic book yield analysis method, according to the present invention, along with its underlying calculations.

FIGS. 6A-6D show an example of an embodiment of a data structure according to the present invention, used to store portfolio information in a database on a storage device as implemented by a computer system performing dynamic book yield analysis.

DETAILED DESCRIPTION

Figure 1A:
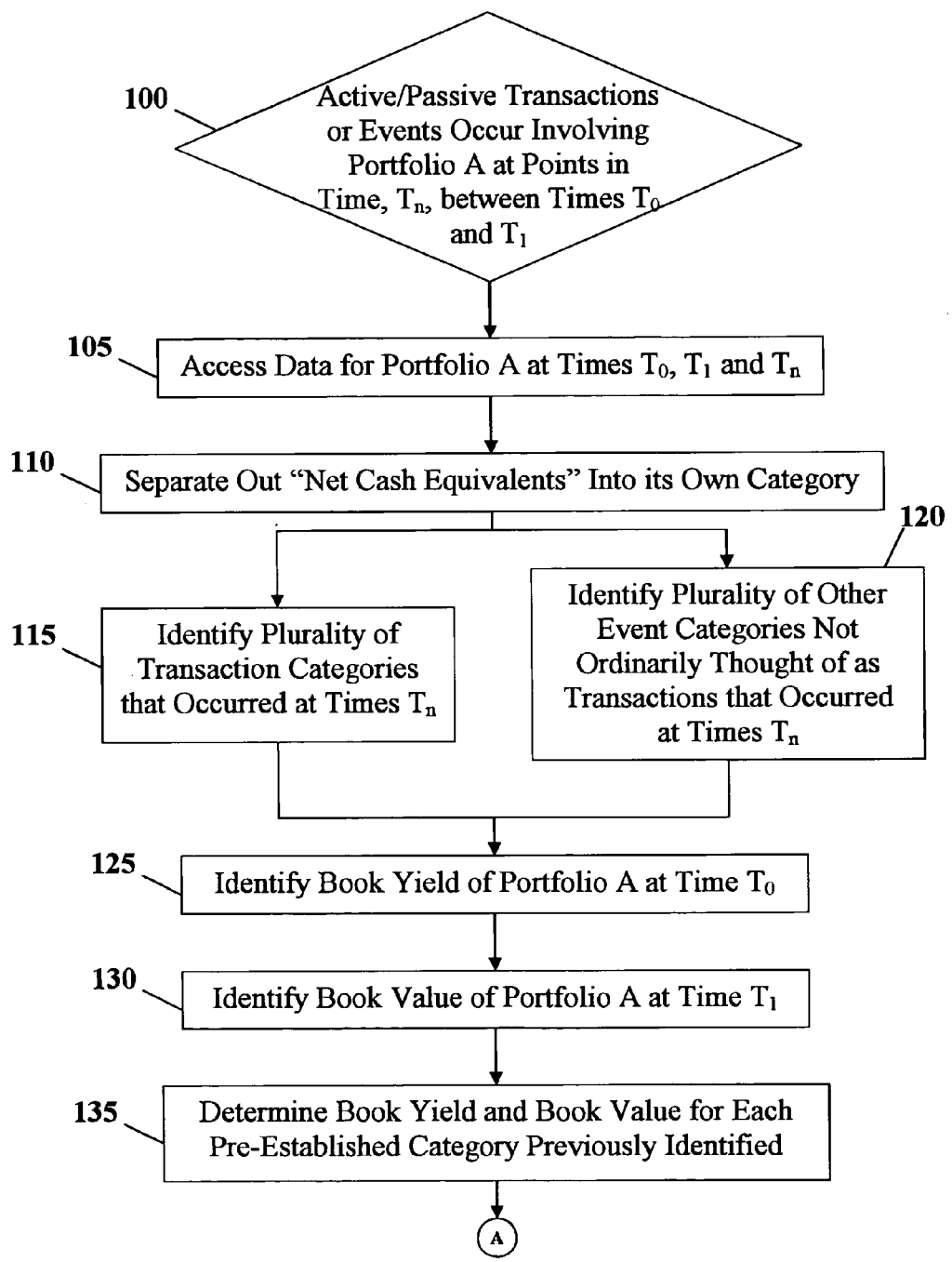
FIGS. 1A-1B show a flow chart for an embodiment of a method for analyzing how a fixed income portfolio's book yield changes over a given period and using that analysis to make and execute transactions involving the portfolio.
Figure 1B:
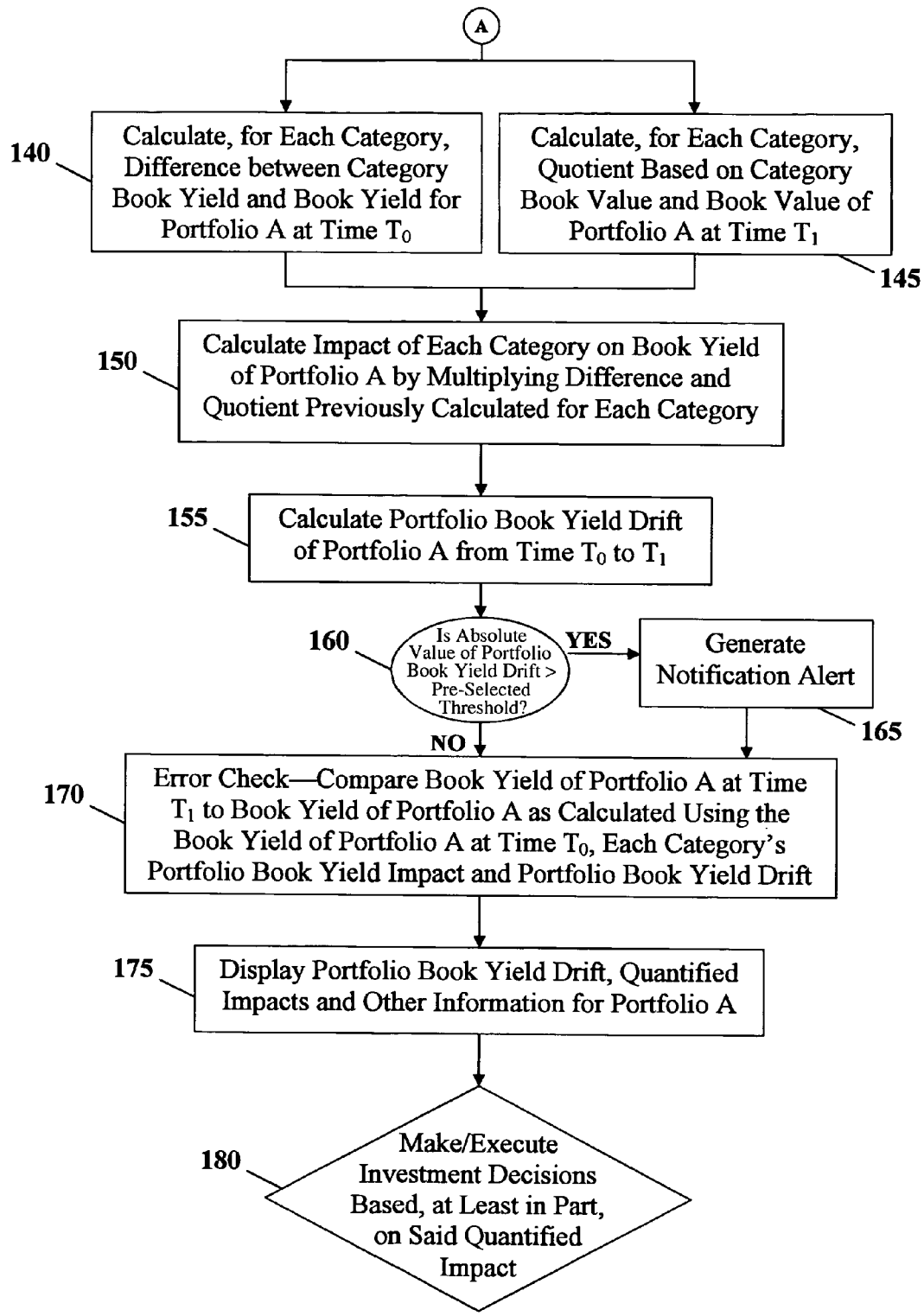

FIG. 1A and FIG. 1B show a flow chart of a dynamic book yield analysis method in an embodiment of the present invention. The methods described herein can be implemented using a computer system in an embodiment of the present invention. First, various investment transactions and events such as buys, sells, transfers, amortizations, etc., occur in a pre-existing investment portfolio at points in time, $T_n$, between a beginning time $T_0$ and an ending time $T_1$ 100. According to the method, a computer system accesses data for this portfolio, including data for the portfolio at times $T_0$ and $T_1$, and for the various transactions and events that occurred at various points in time, $T_n$, between times $T_0$ and $T_1$ 105. "Net Cash Equivalents" are then separated out into their own category 110. The computer system next identifies and sorts each transaction (e.g. buys, sells, transfers) into a plurality of transaction categories based on transaction type 115. The computer system also identifies and sorts each event not ordinarily thought of as a "transaction" (e.g. amortization) into a plurality of event categories based on event type 120. The computer system then identifies the portfolio book yield at beginning time $T_0$ 125, identifies the portfolio book value at ending time $T_1$ 130, and determines the book yield and book value for each pre-established category previously identified 135.

Next, the computer system calculates, for each category, the difference between category book yield and the portfolio book yield at beginning time $T_0$ 140, and calculates, for each category, a quotient based on category book value and the portfolio book value at ending time $T_1$ 145. The computer system next calculates the impact of each category on the overall portfolio book yield by multiplying the difference and quotient previously calculated for each category 150. The computer system will then calculate the portfolio book yield drift from time $T_0$ to time $T_1$ 155. In one embodiment of the present invention, the calculated portfolio book yield drift will be compared to a pre-selected threshold value 160. If the calculated absolute value of the portfolio book yield drift exceeds the pre-selected threshold value, a party interested in the portfolio (e.g. investor or portfolio manager) will receive an appropriate alert, such as an e-mail, notifying the party of this fact 165. The notification alert may or may not include a full report of the dynamic book yield analysis.

The computer system will next check for errors by comparing the portfolio book yield at ending time $T_1$ to the portfolio book yield as calculated using the portfolio book yield at time $T_0$, each category's book yield impact and the calculated portfolio book yield drift 170. The quantified impact of each category, the portfolio book yield drift and other information for the portfolio may then be displayed to a user (e.g. investor or portfolio manager) interested in dynamic book yield analysis for the particular portfolio 175. This information may be displayed in a variety of reporting formats such as webpage, e-mail, hard copy, etc. via a variety of reporting methods such as Internet, cell phone, pager, postal service, etc. Such reports may be generated periodically, upon solicitation by an interested party or upon the existence of a specified condition detected by the computer system implementing the method. In an embodiment of the present invention, these reports will be in the form of the user interfaces, which may be but are not limited to documents, shown in FIG. 2 and FIG. 3 and described below. Based on the results of the analysis, the user may then make and execute investment decisions based, at least in part, on the quantified impact shown by the displayed analysis results 180.

A user interface embodying the present invention is shown in FIG. 2 and FIG. 3. The user interface provides for a dynamic book yield analysis of a bond portfolio from a beginning time $T_0$ to an ending time $T_1$. The user interface comprises a portfolio book yield attribution summary functionality (FIG. 2) and a portfolio book yield attribution detail (FIG. 3).

As shown in FIG. 2, an embodiment of a portfolio book yield attribution summary can comprise a plurality of information fields, including Beginning Portfolio 210, Buys 215, Sells 220, Paydowns 225, Transfer In 230, Transfer Out 235, Calls 240, Net Cash Equivalents 245, Cash Change 250, Amortization 255, Other 260, Book Yield Drift 265, and Ending Portfolio 270. Each information field comprises a value for the parameter name 200 and values for at least one of the following additional parameters, Portfolio Book Value 201, Category Book Yield 202, Portfolio Basis Point Impact 203, and Realized Gain/Loss 204.

The information field Beginning Portfolio 210 represents the entire bond portfolio at beginning time $T_0$. Beginning Portfolio 210 comprises entries for Portfolio Book Value 201, and Category Book Yield 202, where the value for Portfolio Book Value 201 represents the book value of the bond portfolio at beginning time $T_0$, and the value for Category Book Yield 202 represents the book yield for the bond portfolio at beginning time $T_0$. These values are calculated in accordance with known methods.

The information field Ending Portfolio 270 represents the entire bond portfolio at ending time $T_1$. Ending Portfolio 270 comprises values for Portfolio Book Value 201, Category Book Yield 202, and Portfolio Basis Point Impact 203, where the value for Portfolio Book Value 201 represents the book value of the bond portfolio at ending time $T_1$, the value for Category Book Yield 202 represents the book yield for the bond portfolio at ending time $T_1$, and the value for Portfolio Basis Point Impact 203 represents the change in book yield from beginning time $T_0$ to ending time $T_1$. These values are calculated in accordance with known methods.

The information fields Buys 215, Sells 220, Paydowns 225, Transfer In 230, Transfer Out 235, Calls 240, Net Cash Equivalents 245, Cash Change 250, Amortization 255, and Other 260 represent categories of transactions or events that affected the bond portfolio from beginning time $T_0$ to ending time $T_1$; where each value for Portfolio Book Value 201 represents the cumulative effect on the bond portfolio's book value of all transactions or events within a specific category that occurred from beginning time $T_0$ to ending time $T_1$; each value for Category Book Yield 202 represents the overall book yield for all transactions or events within a specific category that occurred from beginning time $T_0$ to ending time $T_1$; each value for Portfolio Basis Point Impact 203 represent the cumulative effect on the bond portfolio's book yield of all transactions or events within a specific category that occurred from beginning time $T_0$ to ending time $T_1$; and each value for Realized Gain/Loss 204 represents the cumulative realized accounting gain or loss, if any, associated with all transactions or events within a specific category that occurred from beginning time $T_0$ to ending time $T_1$.

Figure 4A:
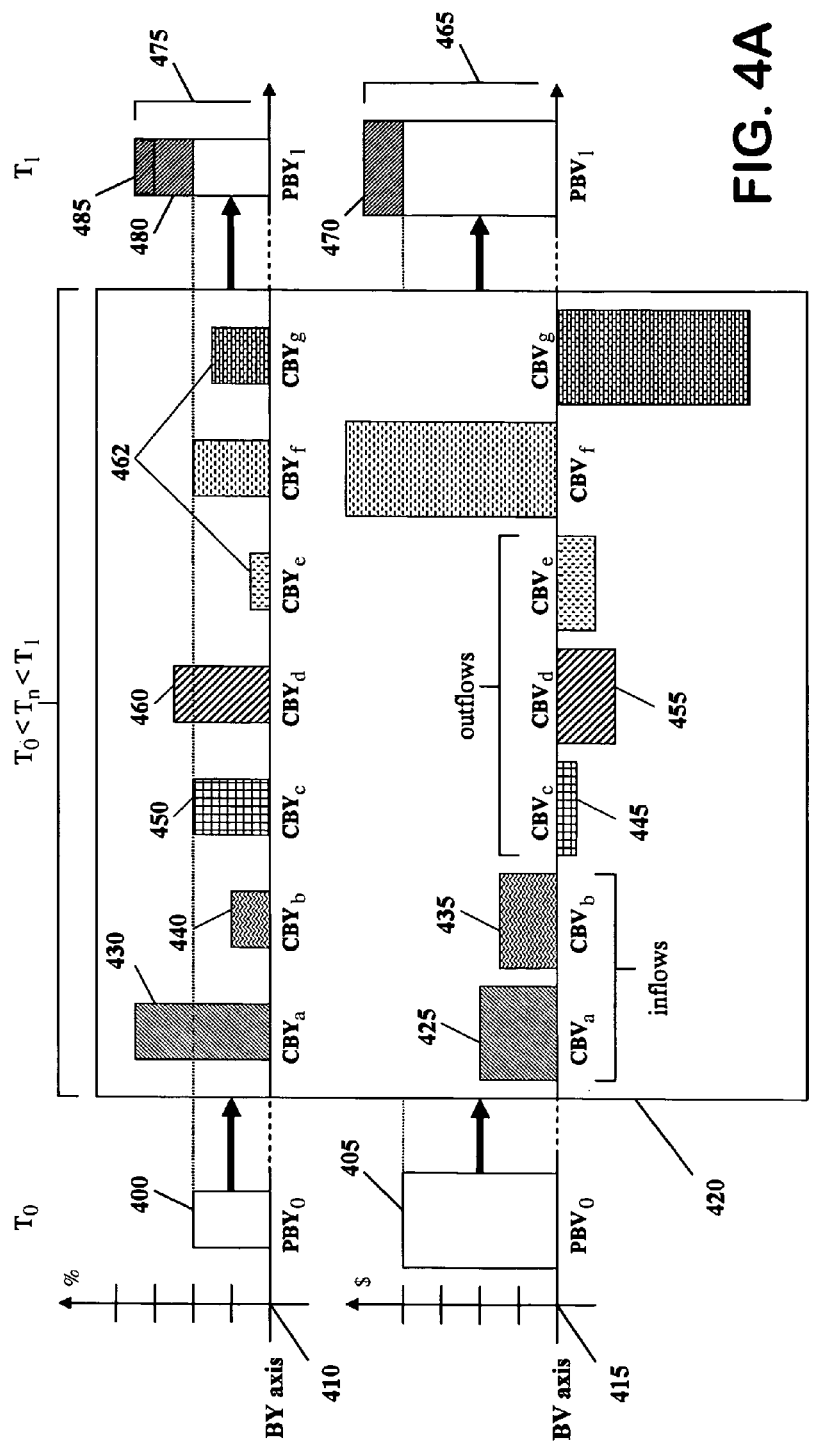
Figure 4B:
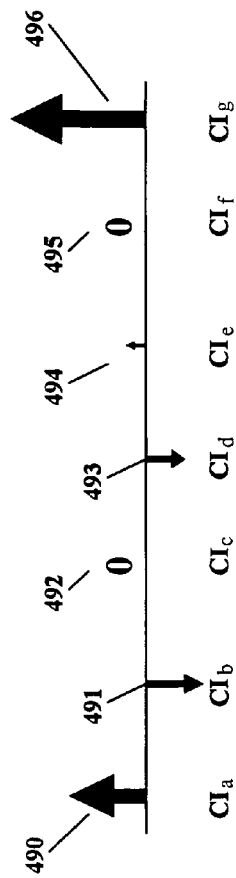

For each information field representing a category of transactions or events, the values for Portfolio Book Value 201 and Category Book Yield 202 are calculated in accordance with known methods. The value for Portfolio Basis Point Impact 203 is calculated by determining the difference between the book yield for the bond portfolio at beginning time $T_0$ and the book yield for a transaction/event category. The difference is then multiplied by a weighting factor, where the weighting factor is equal to the book value for that transaction/event category divided by the book value for the bond portfolio at ending time $T_1$ Example calculations are shown for various embodiments of the present invention as illustrated in FIG. 4A, FIG. 4B and FIG. 4C, described in detail below.

The information field Buys 215 represents the bonds that were purchased from beginning time $T_0$ to ending time $T_1$. The information field Sells 220 represents the bonds that were sold from beginning time $T_0$ to ending time $T_1$.

The information field Paydowns 225 represents a return of principal to a bond investor on a pre-payable security from beginning time $T_0$ to ending time $T_1$ These returns of principal include both scheduled (due per contractual requirements) and unscheduled (paid in advance of contractual requirements) returns. One example is a mortgage pass through bond, which is a bond that is collateralized by a pool of residential mortgages. The underlying mortgages are required to pay principal and interest on a monthly basis which is passed through to the bond investor—this is a scheduled principal payment. The underlying mortgages may also be pre-paid, including additional principal payments by mortgagors and total payments of the outstanding mortgage. Both types of returns of principal are labeled "paydowns," even though the former type is technically a maturity.

The information field Cash Change 250 represents the change from beginning time $T_0$ to ending time $T_1$ in the amount of cash that is part of a bond portfolio. The value Category Book Yield 202 is defined to be 0%. Accordingly, increases in cash will reduce the bond portfolio's book yield and decreases in cash will increase the bond portfolio's book yield. In an embodiment of the present invention, the value of Portfolio Basis Point Impact 203 for the information field Cash Change 250 is determined based upon the difference in cash from beginning time $T_0$ to ending time $T_1$. The calculation is depicted below in Equation 2.

$$\text{Cash change effect} = \qquad (2)$$
$$(\text{cash book yield of } 0\% - \text{beginning portfolio's book yield}) *$$
$$[(\text{ending cash} - \text{beginning cash}) / \text{ending portfolio's book value}]$$

The information field Net Cash Equivalents 245 represents the short-term securities that are held in the bond portfolio during the period from time $T_0$ to time $T_1$. Short term securities usually have a maturity of 90 days or less, and are often used as a temporary investment until a suitable long-term investment is found. Since short-term securities investments are temporary in nature and not reflective of the long-term intentions of the investor, all such activity is separated out from the other transaction/event categories and placed into the Net Cash Equivalents 245 information field. This segregation enhances the utility of the systems and methods according to the present invention, as it eliminates the distortion that short-term investment activities can have on other categories if not segregated.

The information field Amortization 255 represents the cumulative change in the bond portfolio's book value from beginning time $T_0$ to ending time $T_1$ that results from decreases (via amortization) or increases (via accretion) in the book value of specific bonds. For example, a bond that has a beginning book value of $105 yielding 5% has $3 of amortization during the period with a resulting ending book value of $102 while still yielding 5%. Since the book value of the bond is reduced, it has a smaller contribution to overall portfolio value at the end of the period. Additionally, since amortization changes the overall book value of the bond portfolio, it changes the weighting factors used to calculate the portfolio's overall book yield. Amortization is not ordinarily considered a transaction in accounting systems. Accordingly, the values of Portfolio Book Value 201 and Category Book Yield 202 for Amortization 255 must be calculated. The calculation can be accomplished by first calculating what the book value would have been if there were no amortization and then comparing those values to the actual values for book value.

Many investors may have multiple portfolios and sometimes wish to transfer securities among them. The information fields Transfer In 230 and Transfer Out 235 represent securities that have been transferred among an investor's portfolios. Transfer Out 235 may have realized gains or losses associated with it.

An issuer of a security may have the ability to replace an investor's bond with another having different attributes. These transactions are referred to as "exchanges in" and "exchanges out" and information fields for them can be provided in a portfolio book yield attribution summary.

Impairments, more specifically called "other than temporary impairments" in US GAAP and Statutory accounting literature, represent the writing down of the book value of a bond due to the possibility that the investor may not recover their recorded value. Impairments impact portfolio book yield in two ways: book value impact; and book yield impact. Book value impact occurs when the bond's book value is reduced thereby reducing that bond's weighting factor in the overall portfolio book yield calculation. Book yield impact occurs when the book yield is affected by the impairment, which is dependent upon how the investor accounts for the impairment. Any change in yield of the subject bond effects its contribution to overall book yield. The book yield impact is analyzed using book yield drift analyses that are described in detail below.

The information field Other 260 is used to account for changes in book yield that are not otherwise accounted for. Generally, this category should be -0-. The computer system calculates what the ending book yield for the portfolio should be based on beginning positions and all the transaction/event categories. It then compares this result to actual ending values. Any differences between the two are reported in Other 260. A value in this category indicates that a transaction/event occurred that effected book yield of the portfolio but is not included in one of the standard transaction/event categories— it serves as an error check to ensure that all transaction/event categories are included in the analysis.

The information field Book Yield Drift 265 represents the weighted sum of the changes in an individual bond's book yield from beginning time $T_0$ to ending time $T_1$. The book yield of a held bond may change from period to period. This is commonly associated with prepayable securities such as mortgage pass through bonds. For example, a mortgage pass-through purchased at a premium may have an expected life of 10 years at time of purchase. At a subsequent date the expected life is revised to 5 years due to refinancings of the underlying mortgages triggered by falling mortgage interest rates. The resulting accounting for the investor is to speed up amortization of the remaining premium to match the new shorter expected life. Faster amortization lowers book yield.

Mortgage pass through bonds are a common example of bonds that exhibit book yield drift. However, other types of bonds can also exhibit book yield drift. For example, structured securities where return of principal to the bond holder is tied to the principal payments on the underlying collateral can create book yield drift. Other types of bonds exhibiting book yield drift include the general category of asset backed bonds which have collateral such as credit card debt, home equity loans, and auto loans.

The calculations for the information field Book Yield Drift 265 are designed to capture and report the portfolio impact of any changes in a bond's yield over a period in time. For example, in some investor's accounting systems the user can change the yield of a bond without effecting a transaction (e.g. changing an incorrect coupon rate).

In order to illustrate the concept of book yield drift, a simplified book yield drift calculation for an individual bond is provided below as Equation 3. The portfolio level book yield drift calculation is the sum of the individual bonds' book yield drifts.

Simplified Bond Level Book Yield Drift = Gross Book Yield Drift * Weightings    (3)

Where:

Gross Book Yield Drift = bond's beginning yield − bond's ending yield    (3a)

Weightings = bond's ending book value/portfolio's ending book value    (3b)

Equation 3 may not account for all instances of book yield drift, since a bond can come into a portfolio at any point during a period at a given yield, have a change in yield during the period (a.k.a. drift), and then leave the portfolio before the end of the period. Despite the bond not being in the ending portfolio, its drift causes a change in the overall portfolio's book yield and that change should be accounted for. The following example illustrates this point:

a. Bond is purchased during the period at 5%. The purchase is accounted for using a book yield of 5%.
b. The book yield on the bond drifts to 5.5% at which point it is sold. The sale is accounted for using a book yield of 5.5%.
c. The bond was purchased and sold during the period, and therefore does not exist in the ending portfolio. Since the subject bond is not in the ending portfolio it has no contribution to the overall portfolio's book yield. However, the two transactions do not net to -0- due to drift on the bond. Accordingly, all bonds that existed in the portfolio at some point during the period must be accounted for.

Equation 4, which is provided below, provides a means of calculating book yield drift that takes into account the bonds that have been sold during the time period of interest.

$$\text{Actual bond level book yield drift} = \text{Gross Book Yield Drift} * \text{Weightings} \quad (4)$$

Where:

$$\text{Gross Book Yield Drift} = \text{beginning yield} - \text{ending yield} \quad (4a)$$

$$\text{Weightings} = [\text{bond's end } BV + \sum(\text{bond level outflow } BV)] / \text{portfolio's ending book value} \quad (4b)$$

Where:

$$\text{Beginning yield} = [(\text{bond's beg } BV * \text{bond's beg } BY) + \sum(\text{bond level inflow } BV * \text{bond level inflow } BY)] / [\text{bond's beg } BV + \sum(\text{bond level inflow } BV)] \quad (4c)$$

$$\text{Ending yield} = [(\text{bond's ending } BV * \text{bond's ending } BY) + \sum(\text{bond level outflow } BV * \text{bond level outflow } BY)] / [\text{bond's ending } BV + \sum(\text{bond level outflow } BV)] \quad (4d)$$

In the above equations, BY is an abbreviation for "book yield," BV is an abbreviation for "book value" and "beg" is an abbreviation for "beginning." Inflows are all transaction/event categories that add a bond book value to a portfolio (e.g. buys, transfers in, exchanges in, accretion). A bond can have more than one inflow in a period, hence the need for the summations in the formulas. Outflows are all transaction/event categories that reduce bond book value of a portfolio (e.g. sells, maturities, paydowns, transfers out, exchanges out, amortization). A bond can have more than one outflow in a period, hence the need for the summations in the formulas.

As shown in FIG. 3, an embodiment of a portfolio book yield attribution detail can comprise a plurality of bond categories 300, wherein each bond category comprises a bond category name 310 and a plurality of bond fields 320. Each bond field 320 comprises values for the following parameters, Security Name 301, Trade Date 302, Settle Date 303, Units 304, Price 305, Book Value 306, Book Yield 307, Basis Point Impact 308, and Market Value 309.

Although a number of specific information fields have been described for an embodiment of the present invention, no specific information field is necessary to the invention. Indeed, specific implementations of the invention may categorize the transactions or the factors that affect book value in numerous ways and still be within the scope of the present invention. For example, an information field that represents a category of like kind exchanges of securities could be provided. Additionally, the present invention is not limited to bond portfolios, but is applicable to other types of investment or mixed portfolios, provided that such investments have a book value and a book yield or corollaries to book value and book yield.

In one embodiment of the invention, the documents described above and shown in FIG. 2 and FIG. 3 are static presentations of information that can not be altered by a user. In another embodiment of the invention, these documents are interactive in a number of ways not limited to that described herein. For example, a user may query the portfolio book yield attribution summary (FIG. 2) and/or the portfolio book yield attribution detail (FIG. 3). A user may also alter the presentation of data by sorting the information or by limiting the information displayed according to user-specified criteria. Embodiments of the invention may provide for a user to choose to display only certain categories of transactions, transactions involving a specific entity, transactions occurring within a particular date range, or transactions bearing a certain range of book values or book yields. Embodiments providing for user-specified criteria for displaying information are not limited to these examples and may include other ways in which a user can choose to display information on a user interface.

In one embodiment of the present invention, the portfolio book yield attribution summary (FIG. 2) and the portfolio book yield attribution detail (FIG. 3) are generated and viewed as separate and distinct documents. In another embodiment of the present invention, the two documents might be linked such that when a user selects a specific category of transactions listed on the summary a detail view of all the transactions within that category will be displayed in a format similar to that shown in FIG. 3. Other embodiments of the present invention may incorporate additional forms of user interaction and interface functionality and are not limited to that which has already been described in detail.

FIG. 4A and FIG. 4B represent an embodiment of a method for performing dynamic book yield analysis. The methods described herein can be implemented using a computer system in an embodiment of the present invention, e.g. as in FIG. 5A and FIG. 5B described below. In FIG. 4A, $PBY_0$ 400 and $PBV_0$ 405 represent portfolio book yield and portfolio book value, respectively, for a given portfolio at a beginning time $T_0$. The quantities $PBY_1$ 475 and $PBV_1$ 465 represent portfolio book yield and portfolio book value, respectively, for the portfolio at an ending time $T_1$. The center box 420 represents a series of transactions/events that occur in the portfolio at any time $T_n$ after beginning time $T_0$ and before ending time $T_1$. In the center box 420, each bar along the horizontal BY-axis 410 represents the book yield for each category of transactions/events occurring at any time $T_n$ between times $T_0$ and $T_1$. In the center box 420, each bar along the horizontal BV-axis 415 represents the book value for each category of transactions/events occurring at any time $T_n$ between times $T_0$ and $T_1$.

For example, $CBY_a$ 430 and $CBV_a$ 425 may represent the book yield and book value, respectively, for the entire category of "buy" transactions that occurred between times $T_0$ and $T_1$. The quantities $CBY_b$ 440 and $CBV_b$ 435 may represent the book yield and book value, respectively, for the entire category of "transfer in" transactions that occurred between times $T_0$ and $T_1$. These two categories are examples of inflows that may occur in a portfolio and their book values are represented above the horizontal BV-axis 415 because they add value to the portfolio. On the other hand, $CBY_c$ 450 and $CBV_c$ 445 may represent the book yield and book value, respectively, for the entire category of "sell" transactions that occurred between times $T_0$ and $T_1$. The quantities $CBY_d$ 460 and $CBV_d$ 455 may represent the book yield and book value, respectively, for the entire category of "transfer out" transactions that occurred between times $T_0$ and $T_1$. These two categories are examples of outflows that may occur in a portfolio and their book values are represented below the horizontal BV-axis 415 because they subtract value from the portfolio. Note that the sum of all transaction/event category book values occurring between times $T_0$ and $T_1$ 470 equals the difference between the portfolio book value at beginning time $T_0$ ($PBV_0$) 405 and the portfolio book value at ending time $T_1$ ($PBV_1$) 465.

For each transaction/event category, the category book yield, as displayed along the BY-axis 410, may be greater than or less than the portfolio book yield at beginning time $T_0$ ($PBY_0$) 400. The difference between the portfolio book yield at beginning time $T_0$ ($PBY_0$) 400 and ending time $T_1$ ($PBY_1$) 475 is equal to the sum of each transaction/event category's calculated book yield impact 480, as illustrated in FIG. 4B, plus or minus the portfolio book yield drift 485, calculated as described above.

FIG. 4B represents the book yield impact corresponding to each transaction/event category represented in FIG. 4A. In an embodiment of the present invention, the book yield impact for a given transaction/event category is calculated according to the following formula:

$$(CBY_n - PBY_0) * (CBV_n / PBV_1), \qquad (5)$$

where $CBY_n$ and $CBV_n$ are the book yield and book value, respectively, for some category "n" of transactions/events occurring between beginning time $T_0$ and ending time $T_1$, $PBY_0$ is the portfolio book yield at beginning time $T_0$, and $PBV_1$ is the portfolio book value at ending time $T_1$.

If a category's transactions/events occur at a yield equal to the portfolio book yield at beginning time $T_0$, then that category's book yield will have no impact on the overall portfolio book yield. For example, categories "c" and "f" on FIGS. 4A and 4B have no impact on the overall portfolio book yield ($CI_c$ 492 and $CI_f$ 495) because each of those category's book yields are equal to the portfolio book yield at beginning time $T_0$ ($PBY_0$) 400.

If a category's transactions/events occur at a yield higher than the portfolio book yield at beginning time $T_0$, categories including inflows will increase the overall portfolio book yield while categories including outflows will decrease the overall portfolio book yield. For example, category "a" includes inflow transactions/events. Because its book yield ($CBY_a$) 430 is greater than the portfolio book yield at beginning time $T_0$ ($PBY_0$) 400, category "a" has the effect of increasing the overall portfolio book yield ($CI_a$ 490). On the other hand, category "d" includes outflow transactions/events so although its book yield ($CBY_d$) 460 is also greater than the portfolio book yield at beginning time $T_0$ ($PBY_0$) 400, category "d" has the effect of decreasing the overall portfolio book yield ($CI_d$ 493).

If a category's transactions/events occur at a yield lower than the portfolio book yield at beginning time $T_0$, categories including inflows will decrease the overall portfolio book yield while categories including outflows will increase the overall portfolio book yield. For example, category "b" includes inflow transactions/events. Because its book yield ($CBY_b$) 440 is less than the portfolio book yield at beginning time $T_0$ ($PBY_0$) 400, category "b" has the effect of decreasing the overall portfolio book yield ($CI_b$ 491). On the other hand, categories "e" and "g" include outflow transactions/events. Although their book yields 462 are less than the portfolio book yield at beginning time $T_0$ ($PBY_0$) 400, categories "e" and "g" have the effect of increasing the overall portfolio book yield ($CI_e$ 494 and $CI_g$ 496).

FIG. 4C is a tabular representation of the calculations and analysis described above for a further embodiment of the present invention.

Figure 5A:
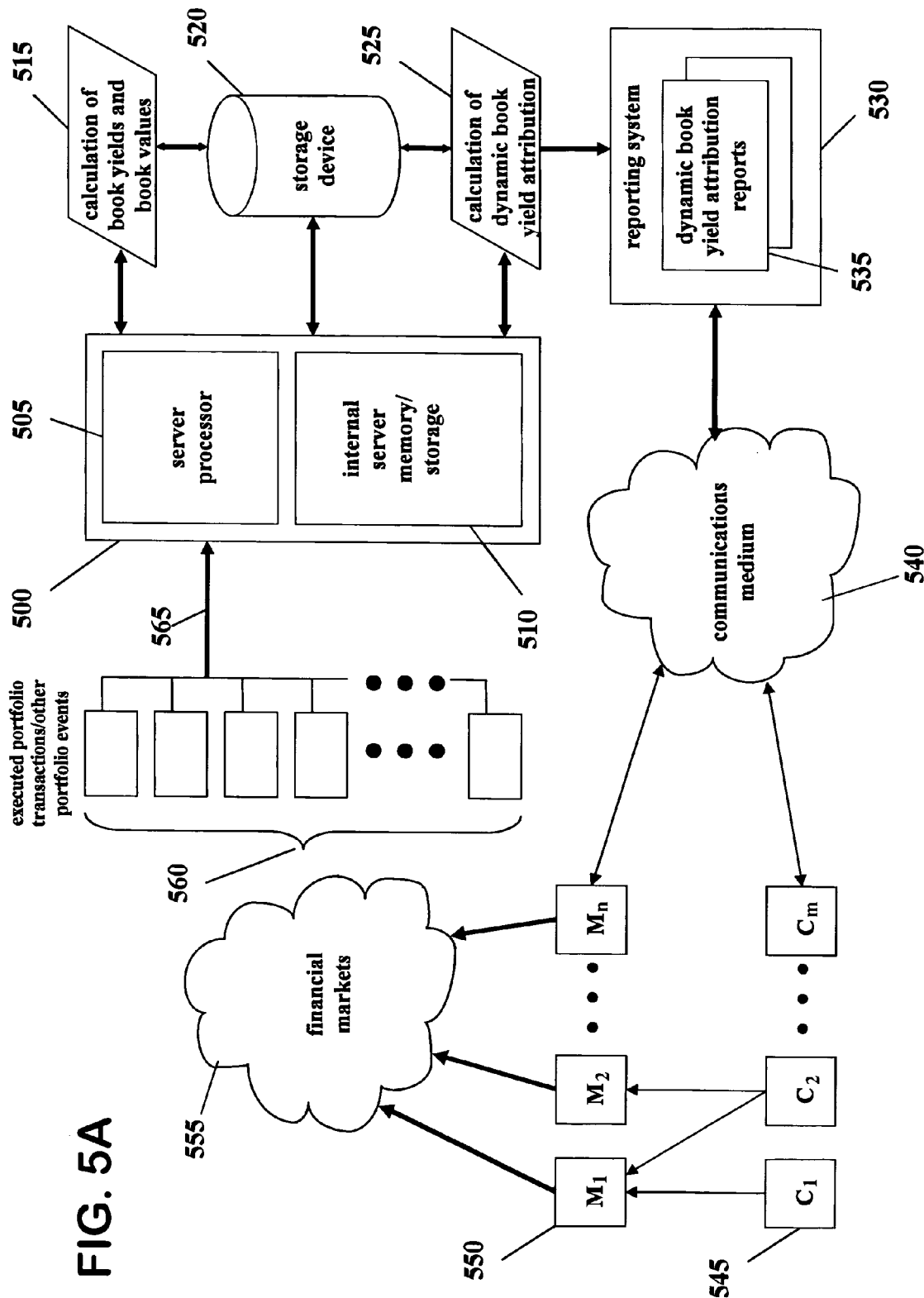
FIGS. 5A-5B show schematic diagrams of computer systems that implement embodiments of various aspects of the dynamic book yield methods according to the present invention.
Figure 5B:
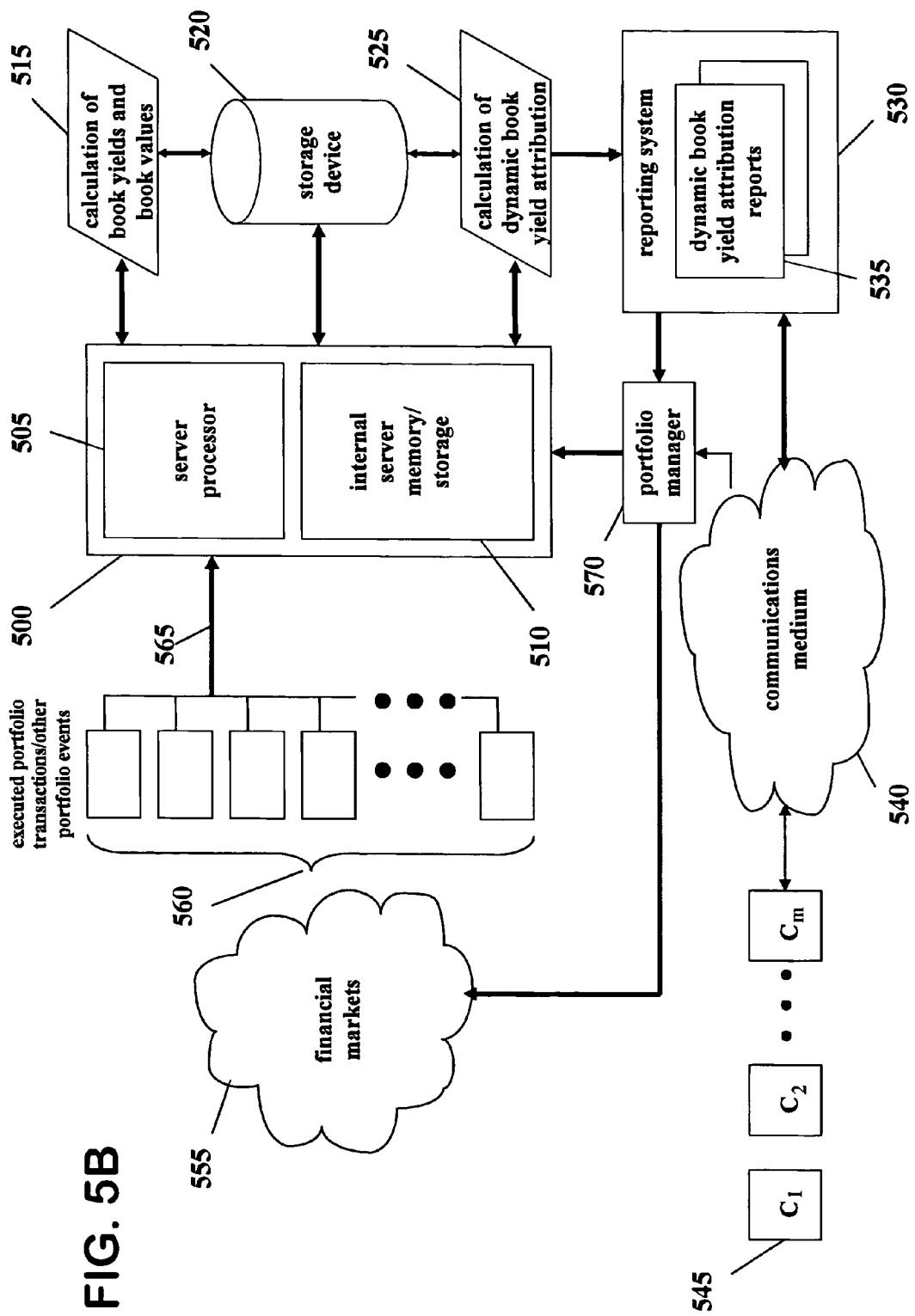

FIG. 5A and FIG. 5B are schematic diagrams of two different embodiments of a system implementing aspects of the present invention, including implementation of the methods, data structures and user interfaces according to the present invention. In each of the two embodiments, the system comprises a server 500 with an internal server processor 505 and an internal server memory/storage unit 510, a storage device 520, a reporting system 530 capable of generating dynamic book yield attribution reports 535, and a market data feed 565 connecting the server 500 to the financial markets 555 where transactions/events occur 560. The relevant financial data for a given portfolio, including any transactions/events 560 that have taken place in the financial market 555, are obtained by the server 500 from the financial markets 555 via a market data feed 565 and imported into a database on a storage device 520. The dynamic book yield analysis routines and algorithms 515/525 retrieve their required inputs from the database on the storage device 520.

FIGS. 6A-6D represent an embodiment of a data structure used to store and access information in the database on the storage device 520. Each row represents a particular asset in the portfolio.

Calculation of book yields and book values 515 and calculation of dynamic book yield attribution 525 may be performed by the internal server processor 505 with programming containing the methods of the present invention stored on the internal server memory/storage unit 510, or they may be performed by anyone on any other device (i.e., an Excel spreadsheet running on a desktop computer) with access to the necessary financial data, such as is stored in the database on the storage device 520. Book yields and book values are calculated in accordance with known methods.

Once the results of the analysis have been calculated, they, along with other data pertaining to the portfolio, are delivered to a reporting system 530 which generates dynamic book yield attribution reports 535 based on the portfolio data and the results of the analysis. In one embodiment, the reports are produced by the reporting system 530 as hard copies and delivered to portfolio managers and client investors through a traditional mail system. In another embodiment, shown in FIG. 5A, the reports are delivered in electronic form directly to remote devices operated by portfolio managers 550 and client investors 545 through a communications medium 540 such as the Internet. In yet another embodiment, shown in FIG. 5B, the reports are delivered in electronic form directly to remote devices operated by client investors 545 through a communications medium 540 such as the Internet and to a portfolio manager 570 directly connected to the system. Portfolio managers, client investors and others make investment decisions and execute additional transactions based, at least in part, on these reports. Any updated market activity would then be stored, according to the process described above, with the rest of an investor's portfolio data in the database on the storage device 520 where it may be accessed for subsequent analysis.

In one embodiment, dynamic book yield attribution reports 535 may be generated periodically as determined by the system operator or any other party responsible for dynamic book yield attribution reporting. In a second embodiment, the reports 535 may be generated upon the request of a portfolio manager, a client investor, or any other party connected to a given portfolio. In a third embodiment, the reports 535 may be generated upon the detection of the existence of a specified condition. For example, if a calculated value exceeds a certain pre-selected threshold, the system may trigger the reporting system 530 to generate and deliver a dynamic book yield attribution report 535. In an embodiment of the present invention, these reports will be in the form of the user interfaces, including but not limited to documents, shown in FIG. 2 and FIG. 3 and described above.

In the embodiment of FIG. 5A, a communications medium 540 such as a network may connect the system to one or more remote devices used by portfolio managers 550 or by client investors 545. Fixed income portfolio managers, investment client service personnel, investment accounting system providers and other investors interested in dynamic book yield analysis for an investment portfolio can use the remote devices 545/550 for a number of purposes. Portfolio managers may use remote devices 550 to access and view portfolio data, interact with the system to generate additional reports, make investment decisions based, at least in part, on the results of the analysis as displayed on their remote devices 550, and execute those investment decisions in the financial markets 555 directly through their remote devices 550 or by any other means known to those skilled in the art. Client investors may use remote devices 545 to access and view portfolio data, interact with the system to generate additional reports, make investment decisions based, at least in part, on the results of the analysis as displayed on the remote devices 545, and direct their portfolio managers 550 to execute those investment decisions in the financial markets 555.

In the embodiment of FIG. 5B, a portfolio manager 570 is part of the overall system, having direct access to the server 500, the reporting system 530, the financial markets 555 where it can execute transactions, and a communications medium 540 whereby it may receive instructions and other communications from client investors. A portfolio manager 570 may access and view portfolio data, interact with the system to run additional analyses or generate additional reports, make investment decisions based, at least in part, on the results of an analysis, and execute those investment decisions in the financial markets 555. A portfolio manager 570 may perform these activities on any device connected to the system and configured for these purposes. Client investors may use remote devices 545 to connect to the system through a communications medium 540 such as a network. Using these remote devices 545, client investors may access and view portfolio data, interact with the system to generate additional reports, make investment decisions based, at least in part, on the results of the analysis as displayed on the remote devices 545, and direct the portfolio manager 570 to execute those investment decisions in the financial markets 555.

Systems according to the present invention, such as are shown in FIG. 5A and FIG. 5B, may comprise any type of conventional computer system and operating system used in the financial services industry. The aspects of the present invention may be practiced using any suitable, conventionally available input, display and data storage devices and may also include an optional communications access device such as a modem, network interface card or port, or wireless transmitter for providing computer-to-computer communication capabilities. It may further involve a web server that would provide connectivity to a network such as an intranet, extranet, or the Internet, allowing for remote access to the software supporting the methods of the present invention. In such a case, a client device may run any suitable web browsing programs or other software that would permit a user to access the network. The system may also include additional software components that would allow a user to view data and information in a range of formats.

The instruction set that is used to direct a system to perform functions according to the present invention may be present as software in memory or implemented as hardware or firmware. The instruction set may be written in any computer language or combination of languages selected by a service provider, coder or programmer. The instruction set may also be a macro or template in a spreadsheet, or a custom-designed and implemented application. A service provider may also choose to implement the invention as an applet within a web page. Other suitable approaches may also be used.

A service provider on a publicly-accessible site, location, or web page, or on a restricted-access site may host the invention. A user may, for example, access the software by running a web browser on a client device and entering a uniform resource locator ("URL") corresponding to the web address of a server system, which may be running a web server which then allows access to the software application.

The detailed embodiments of the present invention show positions, events and transactions on a settlement date basis. This approach differs from most known analytics that report on a transaction date basis. One ultimate purpose of analyzing portfolio book yield is to understand the income-generating ability of a portfolio. Settlement date basis is an improvement over the known transaction date basis because income is earned based on when trades settle, not when they occur.

Embodiments of the present invention may use pre-tax book yields or they may use tax-adjusted book yields. In one embodiment, nominal book yield values are used. Nominal book yield is the book yield of a security with no adjustments for taxes. In another embodiment, after-tax book yield values are used. After-tax book yield is the nominal book yield less an adjustment for the estimated effective tax rate of the investor as it applies to each security held in a portfolio. In yet another embodiment, taxable equivalent book yield values are used. Taxable equivalent book yield is the book yield plus an adjustment for each security that is not fully taxable. It utilizes the estimated effective tax rate and adjusts the book yield upward only for those securities that are not fully taxable. For example, a corporate bond is generally fully taxable, whereas a municipal bond is generally mostly exempt from taxes—the latter is adjusted upward to facilitate comparison to the former.

All aspects of this invention that involve recording, transmitting, modifying, updating, manipulating, calculating, displaying and reporting information concerning portfolios, who owns them, transactions and other events, how they are executed, how tax is reported, and all other processing associated with them, can be performed on one or more computing devices that may be coupled by one or more networks, which may be the public Internet, wide-area and/or local networks, public and/or private.

Specific arrangements and embodiments described above provide examples of the principles covered by the appended claims and their equivalents, but also include many other embodiments and variations, as well as objects and advantages, that may not be explicitly described in this document but that would nevertheless, be appreciated by those skilled in the field of this invention. For example, but without limitation, structural or functional elements might be rearranged, or method steps reordered, consistent with the present invention. Similarly, processors or databases may comprise a single instance or a plurality of devices coupled by network, databus or other information path. Similarly, principles according to the present invention, and systems and methods that embody them, could be applied to other examples, which, even if not specifically described here in detail, would nevertheless be within the scope of the appended claims.

What is claimed is:

1. A method of calculating a portfolio book yield drift occurring in a bond portfolio's book yield from a first time to a second time, the method implemented on a computer comprising a processor programmed to perform the method comprising the steps of:

setting a condition relating to the portfolio book yield drift;
calculating with the computer a gross book yield drift associated with a specific investment of the bond portfolio;
adjusting with the computer the gross book yield drift by a weighting factor to determine a net book yield drift for the specific investment;
calculating with the computer the portfolio's book yield drift based on the net book yield drift;
determining whether the portfolio book yield drift satisfies the condition; and generating an alert if the portfolio book yield drift satisfies the condition; and
forming investment decisions based at least in part on the amount of portfolio book yield drift.

2. The method according to claim 1, wherein determination of whether a transaction occurs between the first time and the second time is based on a settlement date of the transaction.

3. The method of claim 1, wherein the condition is a threshold value.

4. The method of claim 3, wherein the step of determining whether the portfolio book yield drift satisfies the condition corresponds to determining whether the absolute value of the portfolio book yield drift exceeds the threshold value.

5. A method for analyzing a change in book yield of a bond portfolio over time, the method implemented on a computer comprising a processor programmed to perform the method comprising the steps of:

calculating with the computer a first book yield for the portfolio as of a first point in time;
calculating with the computer a second book yield for the portfolio as of a second point in time;
calculating with the computer a change in the book yield of the portfolio, the calculation based on the first book yield and the second book yield;
displaying the amount of total portfolio book yield attributable to pre-established categories of transactions upon receipt of a request; and
forming investment decisions based at least in part on the amount of total portfolio book yield attributable to the pre-established categories of transactions.

6. The method of claim 5, further comprising the step of calculating with the computer a book yield for pre-established categories of transactions occurring between the first and second points in time.

7. The method of claim 6, further comprising the step of calculating with the computer an amount of total portfolio book yield attributable to each of the pre-established categories of transactions.

8. The method according to claim 5, wherein the pre-established categories of transactions comprise non-transactional events that impact the book yield of the portfolio.

9. The method according to claim 5, wherein determination of whether a transaction occurs between the first time and the second time is based on a settlement date of the transaction.

10. The method according to claim 5, wherein the book yield of the portfolio corresponds to a nominal book yield.

11. The method according to claim 5, wherein the book yield of the portfolio corresponds to an after-tax book yield.

12. The method according to claim 5, wherein the book yield of the portfolio corresponds to a taxable equivalent book yield.

13. The method of claim 5, further comprising the step of isolating net cash equivalents from other pre-established categories of transactions that occurred between the first point in time and the second point in time.

14. The method according to claim 5, wherein the step of displaying the amount of total portfolio book yield attributable to each of the pre-established categories of transactions is triggered upon detection of a pre-selected condition.

15. The method according to claim 5, wherein the step of displaying the amount of total portfolio book yield attributable to each of the pre-established categories of transactions is performed on a periodic basis.

\* \* \* \* \*